United States Patent [19]
Asada et al.

[11] Patent Number: 5,988,339
[45] Date of Patent: Nov. 23, 1999

[54] CONFIGURATION FOR RETAINING CLUTCH COVER ASSEMBLY RELEASE-LOAD COMPENSATING CONICAL SPRING

[75] Inventors: Masaaki Asada; Toshiya Kosumi; Hirokazu Wakabayashi, all of Neyagawa, Japan

[73] Assignee: EXEDY Corporation, Neyagawa, Japan

[21] Appl. No.: 08/975,052

[22] Filed: Nov. 20, 1997

[30] Foreign Application Priority Data

Nov. 22, 1996 [JP] Japan ..................................... 8-312147

[51] Int. Cl.⁶ ............................. F16D 13/50; F16D 13/44
[52] U.S. Cl. ...................................... 192/70.27; 192/89.23
[58] Field of Search ............................. 192/70.27, 89.23, 192/109 A, 81.23

[56] References Cited

U.S. PATENT DOCUMENTS

| | | | |
|---|---|---|---|
| 4,210,233 | 7/1980 | Courbot | 192/70.27 X |
| 4,450,945 | 5/1984 | Caray | 192/70.27 X |
| 4,989,709 | 2/1991 | Takeuchi | 192/70.27 X |
| 5,152,385 | 10/1992 | Maucher | 192/70.27 |
| 5,168,974 | 12/1992 | Rivolta et al. | 192/70.27 X |
| 5,501,312 | 3/1996 | Mizukami et al. . | |
| 5,636,721 | 6/1997 | Weidinger | 192/89.23 X |

*Primary Examiner*—Charles A Marmor
*Assistant Examiner*—Roger Pang
*Attorney, Agent, or Firm*—Shinjyu An Intellectual Property Firm

[57] ABSTRACT

Reduced-dimension configuration for retaining a diaphragm spring release-load compensating conical spring in a push-type clutch. The clutch diaphragm spring is retained by a support mechanism that includes axially extending, circularly spaced supports, fixed to the clutch cover, that pass through holes formed at the inter-digital vertices of the diaphragm spring fingers. A diaphragm spring annular pivot is provided on the supports, on the clutch cover side of the diaphragm spring. One edge of the conical spring is supported on an engagement surface of the clutch cover, and the other edge is seated on the diaphragm spring. Engagement tabs project from the edge of the conical spring that is supported on the clutch cover. The engagement tabs are engaged into conical spring engagement holes formed in the clutch cover, or in an alternative embodiment, into inter-digital holes of the diaphragm spring not penetrated by the circularly spaced supports. The engagement tabs thus rigidly retain the conical spring against rotation relative to the clutch cover, or in the alternative embodiment, relative to the diaphragm spring. The configuration reduces the axial dimension of the assembly, on the clutch cover side of the diaphragm spring, to the axial height of the conical spring/diaphragm spring annular pivot, thereby reducing the bending moment on the supports when the clutch is operated.

7 Claims, 2 Drawing Sheets

CONFIGURATION FOR RETAINING CLUTCH COVER ASSEMBLY RELEASE-LOAD COMPENSATING CONICAL SPRING

BACKGROUND OF THE INVENTION

1. Field of the Invention

The present invention relates to a clutch cover assembly, and in particularly to a clutch cover assembly having a truncated conical spring between a diaphragm spring and a clutch cover.

2. Description of the Related Art

In general, a clutch cover assembly is composed of a clutch cover that is fixed to a flywheel, a pressure plate for clamping a frictional member of a clutch disk to a flywheel, and an elastic member for pressing the pressure plate toward the flywheel.

Usually, a diaphragm spring is used as the above-described elastic member. The diaphragm spring is composed of an outer circumferential disk-like elastic member that extends annularly, and a plurality of lever portions that extend radially inwardly from an inner circumferential edge of the disk-like elastic member. Generally, there are two functions associated with the diaphragm spring, the first is to bias movement of the pressure plate with respect the flywheel and the second function is to provide a lever for counteracting the biasing force acting on the pressure plate.

Stated more specifically, in a so-called push type clutch, the radially inward portion of the disk-like elastic member of the diaphragm spring is supported by the clutch cover through a support mechanism. The radially outward portion of the disk-like elastic member thereof pushes the pressure plate toward the flywheel. When end portions, in the radially inward direction, of the lever portions are depressed by a release bearing, the pressure from the diaphragm spring to the pressure plate is released to thereby disengage the clutch.

The force used to counteract or release the biasing force of the diaphragm spring is generally referred to as a release load and the movement of the diaphragm spring as the release load is being applied is referred to as the release stroke. The diaphragm spring typically has spring characteristics such that the required release load decreases as the release stroke progresses (as the level of deformation of the diaphragm spring progresses).

Accordingly, if the diaphragm spring is the only elastic member used in the clutch for the above-mentioned functions, it is possible that undesirable clutch operation feeling may be experience by the vehicle operator. To cope with this, in some clutches, a conical spring is disposed between the clutch cover and the diaphragm spring.

The conical spring extends along the disk-like elastic member of the diaphragm spring with its outer circumferential edge seated on a back surface (surface opposite to the pressure plate) of the diaphragm spring and with its inner circumferential edge supported by the clutch cover. Also, the spring characteristics of the conical spring are set so that the force applied from the conical spring to the pressure plate increases as the release stroke of diaphragm spring increases.

Accordingly, the composite loads of the two springs are applied to the pressure plate. The release load applied to the pressure plate substantially in proportion with the release stroke due to the combination of the force of the diaphragm spring and the conical spring. As a result, a desired clutch operation feeling may be obtained.

However, in the conventional structure, to prevent the rotation of the conical spring and to position it, a support plate or ring is mounted on an inner surface of the clutch cover. The support plate is fixed to studs of the support mechanism fixed to the clutch cover and has cutaway portions with which projections or the like of the conical spring engage.

If such a support plate is provided, the structure becomes more complicated from the resulting increase in the number of the mechanical parts. Also, the length of the stud pins would have to be increased to correspond to the thickness of the support plate. Accordingly, a bending load that would be applied from the diaphragm spring to the stud pins would likely result in slanted stud pins. As a result, there is a fear that the desired clutch engagement/disengagement characteristics may not be obtained.

SUMMARY OF THE INVENTION

An object of the present invention is to provide a clutch cover assembly using a truncated conical spring, in which rotation of the conical spring is prevented without the use of a support plate.

In accordance with one aspect of the present invention, a clutch cover assembly of a clutch mechanism includes a clutch cover formed with at least one engagement hole, a pressure plate disposed within the clutch cover and having a pressure surface for engaging a frictional member in cooperation with a flywheel, a diaphragm spring supported within the clutch cover for urging the pressure plate toward the flywheel. A conical spring having an annular portion is supported on the clutch cover for urging the pressure plate toward the flywheel in parallel with the diaphragm spring. At least one engagement portion is formed integrally with the annular portion. The engagement portion extends at least partially into the engagement hole preventing rotation between the conical spring and the clutch cover.

In accordance with another aspect of the present invention, a clutch cover assembly of a clutch mechanism, includes a clutch cover from which a plurality of circularly spaced supports extend axially toward a flywheel. A pressure plate is disposed within the clutch cover and having a pressure surface for selective engagement with a frictional member in cooperation with the flywheel. A diaphragm spring is supported within the clutch cover, and has an annular elastic portion for urging the pressure plate toward the flywheel. The diaphragm spring is formed with a plurality of slit-separated lever portions extending radially inwardly from the elastic portion, and a hole is formed at the radially outward end of each slit between the lever portions. The circularly spaced supports extend axially through corresponding ones of these holes, wherein the supports retain the diaphragm spring. A conical spring has an annular portion supported on the clutch cover for urging the pressure plate toward the flywheel in parallel with the diaphragm spring. The conical spring is also formed with at least one engagement portion formed integrally with the annular portion. The engagement portion extends in an axial direction at least partially into a corresponding others of the holes between the level portions, wherein the conical spring is rigidly retained against rotation relative to the diaphragm spring the clutch cover.

As described above, according to the present invention, it is possible to dispense with the support plate used in the conventional arrangement. In addition, it is possible to prevent the conical spring from rotating. Accordingly, it is possible to avoid an increase in the number of the components thereby making the structure more complex. Moreover, it is possible to ensure the desired engagement/disengagement characteristics.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

Figure 1:
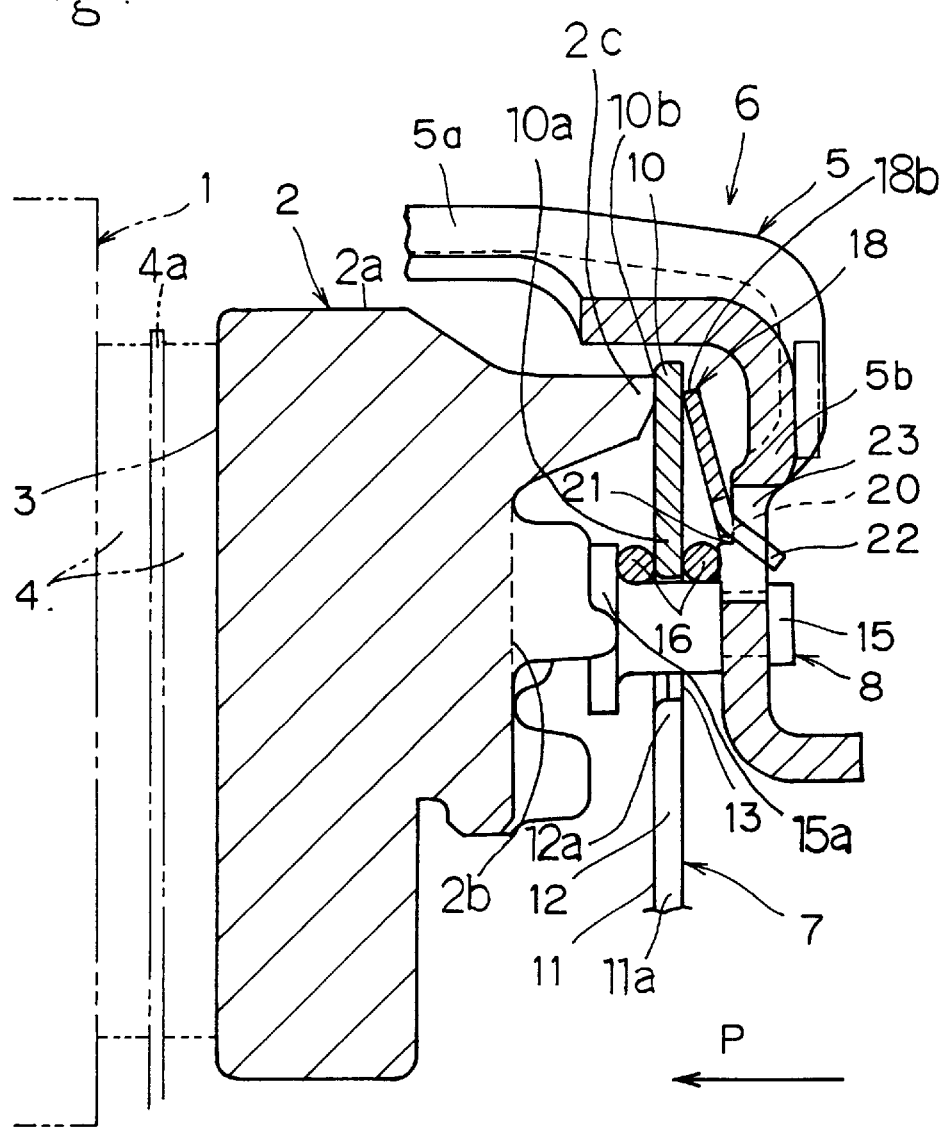
FIG. 1 is a fragmentary cross-sectional view showing a portion of a clutch cover assembly having a conical spring disposed between portions of a clutch cover and a diaphragm spring in accordance with a first embodiment of the invention.

A clutch cover assembly 6 shown in FIG. 1 is a device for selectively transmitting torque from an engine (not shown) to an transmission (not shown). The engine is disposed on the left side of FIGS. 1 and 2 and the transmission is disposed on the right side of FIGS. 1 and 2. Hereinafter, the left side of the drawings is referred to as the engine side and the right side of the drawings is referred to as the transmission side. The clutch cover assembly 6 is configured to engage and disengage frictional members 4 of a clutch disk assembly with respect to a flywheel 1.

The clutch cover assembly 6 is provided with a clutch cover 5, a diaphragm spring 7, a pressure plate 2, a support mechanism 8, and a conical spring 18.

Many aspects of the present invention are similar in configuration to the clutch mechanism and clutch cover assembly disclosed and described in commonly assigned U.S. Pat. No. 5,501,312, based upon Ser. No. 291,650 filed Aug. 16, 1994. U.S. Pat. No. 5,501,312 is incorporated herein by reference in its entirety.

As shown in FIG. 1, a pressure surface 3 of the pressure plate 2 faces the flywheel 1 on the engine side. The frictional members 4 are provided on a cushioning plate 4a of the clutch disk assembly. Only a portion of the clutch disk assembly is shown. The frictional members are disposed between the flywheel 1 and the pressure plate 2. An outer circumferential end portion (not shown) of the clutch cover 5 is fixed to the outer circumferential portion (not shown) of the flywheel 1 in a manner known in the art. The clutch cover 5 covers the outer circumference portion 2a of the pressure plate 2 and the frictional members 4 and at the same time covers the back surface 2b of the pressure plate 2. Namely, the clutch cover 5 has an outer circumference covering portion 5a and an annular plate portion 5b facing the flywheel 1 in the axial direction. A diaphragm spring 7 is supported by the support mechanism 8 on an inner circumferential portion of the annular plate portion 5b of the clutch cover 5.

The diaphragm spring 7 is formed with an annular elastic portion 10 that continuously extends coaxially against the pressure plate 2, and a plurality of lever portions 11 that extend radially inwardly from the inner circumferential portion 10a of the elastic portion 10. The outer circumferential edge 10b of the elastic portion 10 is seated on a projection 2c on the back side of the pressure plate 2. Slits 12 are formed between the adjacent lever portions 11. Oblong holes 13 that have a width greater in the circumferential direction of the clutch than that of the slits 12 are formed at radially outward end portions 12a of the slits 12.

The support mechanism 8 is provided with a plurality of stud pins 15 (support members) extending in the axial direction of the clutch from the clutch cover 5 and a pair of wire rings 16 arranged on each side of the inner circumferential portion 10a of the elastic portion 10. The stud pins 15 are disposed lined in the circumferential direction and extend on the engine side from the clutch cover 5 through some of the oblong holes 13 of the diaphragm spring 7. Each stud pin 15 is in contact with both ends, in the circumferential direction, of a corresponding oblong hole 13. Thus the diaphragm spring 7 is prevented from rotating relative to the clutch cover 5. The stud pins 15 support the inner circumferences of the two wire rings 16. The wire ring 16 that is disposed on the engine side of the diaphragm spring 7 is retained between a flange-like head portion 15a at an end of each stud pin 15 and the elastic portion 10 of the diaphragm spring 7. The wire ring 16 on the transmission side of the diaphragm spring 7 is retained between the annular plate portion 5b of the clutch cover 5 and the elastic portion 10 of the diaphragm spring 7.

On the radially outward side of the wire rings 16, a conical spring 18 is interposed between the elastic portion 10 and the clutch cover 5. The conical spring 18 extends in an annular form along the elastic portion 10. An outer circumferential edge 18b of an annular portion 18a of the conical spring 18 is seated on the elastic portion 10 adjacent to the outer circumferential edge 10b of the elastic portion 10. An inner circumferential edge 20 of the annular portion 18a of the conical spring 18 contacts an engine side surface of the annular plate portion 5b of the clutch cover 5. In FIG. 1, the conical spring 18 is a truncated conical shape, and compresses in the axial direction. The conical spring 18 urges the outer circumferential edge 10b of the disk-like elastic portion 10 of the diaphragm spring 7 toward the pressure plate 2. In other words, the conical spring 18 imparts pressure to the pressure plate 2 through the outer circumferential edge 10b of the diaphragm spring 7. The diaphragm spring 7 and the conical spring 18 are used in combination to apply a load to the pressure plate 2. An engagement surface 21 with which the inner circumferential edge 20 may engage in the radial direction is formed integrally on the engine side of the annular plate portion 5b of the clutch cover 5. Thus, the conical spring 18 is positioned coaxially with the clutch cover 5 and the other components.

Figure 2:
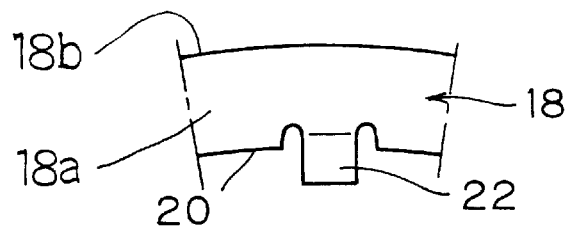
FIG. 2 is a plan view showing a portion of the conical spring depicted in FIG. 1, shown removed from the clutch cover.

FIG. 2 shows a part of the conical spring 18. As is apparent from FIG. 2, three engagement portions 22 (only one of which is shown) projecting radially inwardly from the inner circumferential edge 20 of the annular portion 18a are provided equidistantly and equi-angularly in the conical spring 18. As is apparent from FIG. 1, in the clutch cover 5, three engagement holes 23 are provided equidistantly and equi-angularly on the outer circumferential side of the stud pins 15. As is apparent from FIG. 1, the engagement portions 22 are bent to extend toward the transmission side from the annular portion 18a and extend into the engagement holes 23. Thus, the conical spring 18 is prevented from rotating relative to the clutch cover 5.

With such an arrangement, when the inner circumferential portions 11a of the lever portions 11 may be moved in a direction indicated by an arrow P in FIG. 1 by a release bearing (not shown). As a result of movement in the direction of the arrow P, the diaphragm spring 7 is deformed with its outer circumferential portion (elastic portion 10) being shifted in the opposite direction since the diaphragm spring 7 pivots about the wire rings 16. Thus, the pressure from the diaphragm spring 7 to the pressure plate 2 is released to thereby interrupt the engagement of the clutch. In this clutch disengagement condition, when the pressure from the release bearing to the lever portions 11 is released, the diaphragm spring 7 is elastically restored back to the original position to thereby push the pressure plate 2 toward the flywheel 1 to engage the clutch.

In the above-described engagement/disengagement operation, the pressure plate 2 is subjected to the loads in the clutch engagement direction in parallel (in combination) from both the diaphragm spring 7 and the conical spring 18. Then, when the release stroke (i.e., the shift amount of the release bearing) is increased to some extent by the inherent characteristics of the diaphragm spring 7, the load from the diaphragm spring 7 is temporarily decreased. On the other hand, the initial compression condition and the like of the conical spring 18 are set so that under this condition, the load to the pressure plate 2 is temporarily increased. Accordingly, the conical spring 18 compensates the load of the diaphragm spring 7 that has been temporarily decreased. As a whole, the load substantially in proportion with the release stroke is applied to the pressure plate 2. As a result, a good operational feeling of the clutch may be realized.

In the above-described operation, the inner circumferential edge 20 is in contact with the engagement surface 21 so that the conical spring 18 is positioned in the radial direction relative to the clutch cover 5. Also, the engagement portions 22 are engaged with the engagement holes 23 of the diaphragm spring 7 so that the conical spring 18 is prevented from rotating relative to the clutch cover 5. Accordingly, there is no fear that the position of the conical spring 18 will be displaced.

Also, unlike the conventional structure, no support plate for the conical spring 18 is provided between the clutch cover 5 and the wire ring 16 adjacent thereto. Accordingly, the full length of the stud pins 15 may be shortened. As a result, the bending moment applied from the diaphragm spring 7 to the stud pins 15 is small. There is no fear that the stud pins 15 would be slanted. Thus, since the conical spring 18 and the stud pins 15 are exactly positioned, it is possible to avoid error in the engagement/disengagement characteristics of the clutch.

Figure 3:
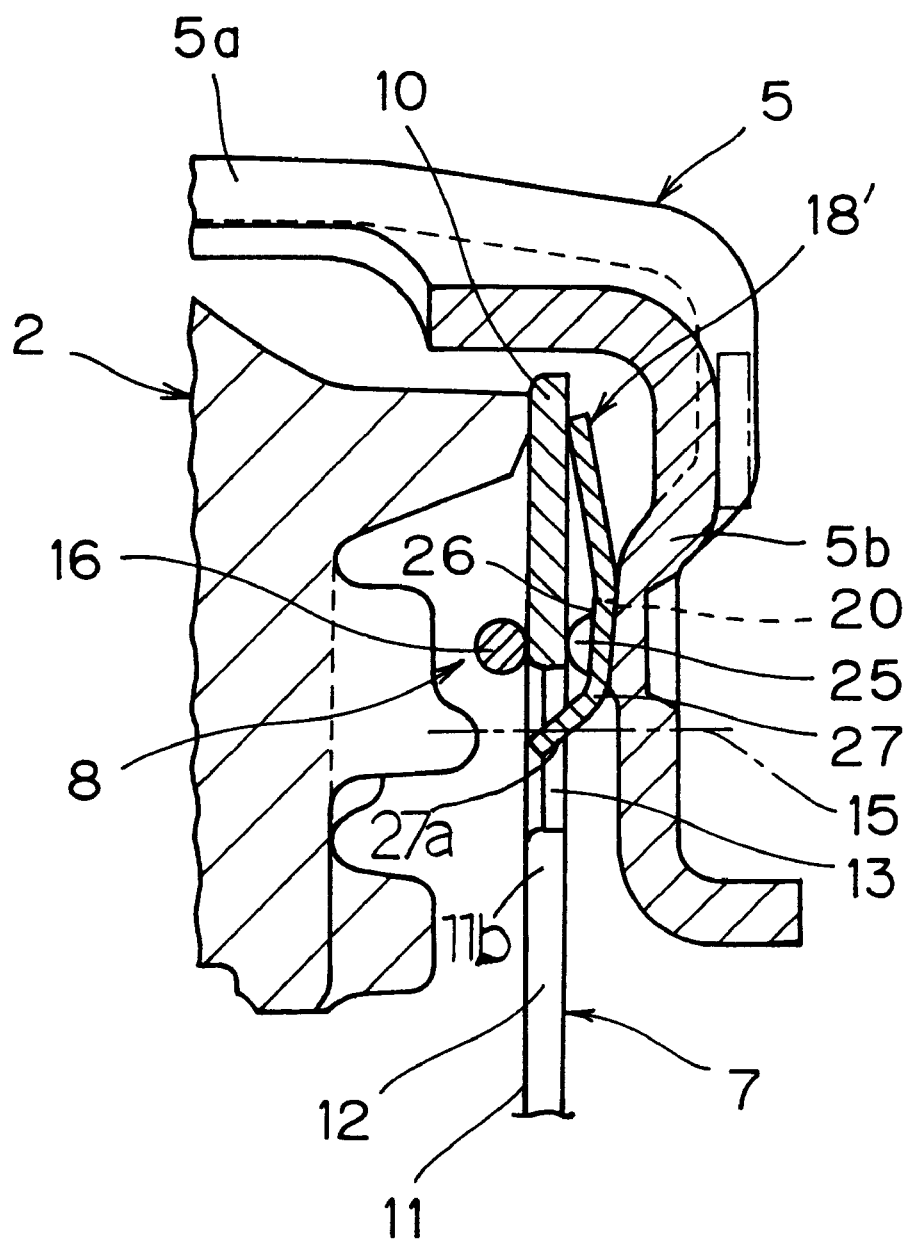
FIG. 3 is a fragmentary cross-sectional view similar to FIG. 1, showing a portion of a clutch cover assembly in accordance with a second embodiment of the invention.

Another embodiment will now be described with reference to FIG. 3. In this embodiment, a plurality of projections 25 are formed on the clutch cover 5. The projections 25 each have a semi-circular cross-section are formed integrally with the clutch cover 5. The projections 25 take the place of the transmission side wire ring 16 described above with respect to FIGS. 1 and 2. The diaphragm spring 7 is supported by the plurality of projections 25 and a single wire ring 16. The wire ring 16 on the engine side in FIG. 3 is retained by the stud pins 15 in the same manner as in the foregoing embodiment.

Engagement surfaces 26 for radially inwardly supporting the inner circumferential edge 20 of the conical spring 18' are formed on the outer circumferences of the proximal end portions of the projections 25. Engagement portions 27 extend radially inwardly between alternating adjacent pairs of the projections 25 (only one of which is shown) in the circumferential direction of the clutch from the inner circumferential edge 20 of the conical spring 18'. The end portions 27a are bent to extend toward the engine side and extend through corresponding oblong holes 13 between the proximal end portions 11b of the lever portions 11 without any displacement in the circumferential direction. The stud pins 15 do not extend through the oblong holes 13 with which the engagement portions 27 engage. In other words, the stud pins 15 and the engagement portions 27 alternately arranged in the circumferential direction.

Also, with this arrangement, since the conical spring 18 and the stud pins 15 are exactly positioned, it is possible to avoid error in the engagement/disengagement characteristics of the clutch.

As described above, according to the present invention, it is possible to dispense with the support plate used in the conventional arrangement. In addition, it is possible to center exactly the conical spring. Accordingly, it is possible to avoid an increase in the number of the components or to avoid making the structure more complex. Moreover, it is possible to ensure the desired engagement/disengagement characteristics.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What we claims is:

1. For a friction clutch mechanism for releasably pressing a friction member axially against an engine flywheel, a clutch cover assembly comprising:

a clutch cover having an annular plate portion extending radially, and having a circumferentially peripheral portion extending axially for mounting on the engine flywheel, said annular plate portion being formed with at least one conical spring engagement hole and with a conical spring engagement surface;

a pressure plate disposed within said clutch cover;

a diaphragm spring disposed axially and pivotally supported between said clutch cover and said pressure plate for urging said pressure plate toward the engine flywheel; and a conical spring having a first circumferential edge supported on said conical spring engagement surface of said clutch cover and a second circumferential edge seated on said diaphragm spring, wherein said conical spring urges said pressure plate toward the engine flywheel in parallel with said diaphragm spring, said conical spring having at least one integrally formed engagement portion extending from one of said first and second circumferential edges at least partially into said conical spring engagement hole, wherein said engagement portion prevents relative rotation between said conical spring and said clutch cover.

2. For a friction clutch mechanism for releasably pressing, a friction member axially against an engine flywheel, a clutch cover assembly, comprising:

a clutch cover having an annular plate portion extending radially, and having a circumferentially peripheral portion extending axially for mounting on an engine flywheel, said annular plate portion being formed with a plurality of circularly spaced pivot projections each having a conical spring engagement surface;

a pressure plate disposed within said clutch cover;

a diaphragm spring disposed axially between said clutch cover and said pressure plate, said diaphragm spring including an annular elastic portion for urging said pressure plate toward the engine flywheel and a plurality of lever portions extending radially inward from said elastic portion, and said diaphragm spring having a plurality of circularly spaced holes formed between said lever portions and said elastic portion;

a diaphragm spring support mechanism including a plurality of circularly spaced studs fixed to said annular plate portion of said clutch cover, and an annular pivot member on said studs on a side axially of said diaphragm spring opposite said pivot projections, said studs extending through corresponding ones of said plurality of circularly spaced holes, wherein said diaphragm spring is pivotably supported within said clutch cover on said studs sandwiched between said annular pivot member and said pivot projections; and a conical spring having an first circumferential edge supported on the conical spring engagement surfaces of said pivot projections and a second circumferential edge seated on said diaphragm spring, wherein said conical spring urges said pressure plate toward the engine flywheel in parallel with said diaphragm spring, said conical spring having at least one integrally formed engagement portion extending from one of said first and second circumferential edges at least partially into a corresponding other of said plurality of circularly spaced holes in said diaphragm spring, wherein said engagement portion prevents relative rotation between said conical spring and said diaphragm spring.

3. A clutch cover assembly according to claim 1, further comprising an annular pivot for pivotally supporting said diaphragm spring on said clutch cover.

4. A clutch cover assembly according to claim 3, wherein said annular pivot is formed in said clutch cover.

5. A clutch cover assembly as set forth in claim 1, further comprising:

a diaphragm spring support mechanism including a plurality of circularly spaced supports extending axially from said annular plate portion of said clutch cover, and a first annular pivot member on said supports on the clutch cover side axially of said diaphragm spring, said diaphragm spring therein being pivotally supported within said clutch cover against said annular pivot member on said supports.

6. A clutch cover assembly as set forth in claim 5, wherein said supports extending axially from said annular plate portion of said clutch cover are stud pins fixed to said clutch cover.

7. A clutch cover assembly according to claim 2, said diaphragm spring support mechanism further including a second annular pivot member on said supports on a side axially of said diaphragm spring opposite said first annular pivot member, wherein said diaphragm spring operates sandwiched between said first and second annular pivot members in a push-type clutch.

* * * * *